United States Patent
Xu (10) Patent No.: US 9,965,733 B2
(45) Date of Patent: May 8, 2018

(54) METHOD, APPARATUS, AND COMMUNICATION SYSTEM FOR UPDATING USER DATA BASED ON A COMPLETION STATUS OF A COMBINATION OF BUSINESS TASK AND CONVERSATION TASK

(71) Applicant: TENCENT TECHNOLOGY (SHENZHEN) COMPANY LIMITED, Shenzhen (CN)

(72) Inventor: Bo Xu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 342 days.

(21) Appl. No.: 14/639,512

(22) Filed: Mar. 5, 2015

(65) Prior Publication Data
US 2015/0178667 A1 Jun. 25, 2015

Related U.S. Application Data (63) Continuation of application No. PCT/CN2014/082742, filed on Jul. 22, 2014.

(30) Foreign Application Priority Data

Jul. 22, 2013 (CN) .......................... 2013-10309057

(51) Int. Cl.
G06Q 10/00 (2012.01)
G06Q 10/06 (2012.01)

(52) U.S. Cl.
CPC .................... *G06Q 10/063114* (2013.01)

(58) Field of Classification Search
CPC ............................................ G06Q 10/063114
(Continued)

(56) References Cited

U.S. PATENT DOCUMENTS 6,868,154 B1* 3/2005 Stuart ................... H04M 3/51
379/221.01
7,783,513 B2* 8/2010 Lee .................. G06Q 10/06398
705/7.42
(Continued)

FOREIGN PATENT DOCUMENTS

CN 101009575 A 8/2007
CN 101212319 A 7/2008
(Continued)

OTHER PUBLICATIONS

The State Intellectual Property Office of the People's Republic of China (SIPO) Office Action 1 for 201310309057.5 dated Aug. 19, 2015 pp. 1-9.
(Continued)

*Primary Examiner* — Sujay Koneru
(74) *Attorney, Agent, or Firm* — Anova Law Group, PLLC (57) ABSTRACT

Method, apparatus, and communication systems of updating user data are provided. Business flow data and conversation flow data of a first user are obtained. Whether the first user has completed a preset first business task is determined according to the obtained business flow data, and whether the first user has completed a preset first conversation task is determined according to the obtained conversation flow data. After determining that the first user has completed the preset first business task and the preset first conversation task, a user data update volume corresponding to a first task group is obtained and updated. The introduction of the task group can help to prevent cheating behaviors, and can help to improve security of updating user data. The introduction of the conversation task can help to improve utilization of network resources, and help to promote business growth and better precipitation of user relationship chains.

18 Claims, 4 Drawing Sheets

(58) Field of Classification Search
USPC ..................................................... 705/7.15
See application file for complete search history.

(56) References Cited

U.S. PATENT DOCUMENTS

| | | | | |
|---|---|---|---|---|
| 7,853,465 | B2* | 12/2010 | Molesky | ........... G06F 17/30551 |
| | | | | 705/7.11 |
| 8,531,501 | B2* | 9/2013 | Portman | ............. H04M 3/5133 |
| | | | | 348/14.02 |
| 2003/0189637 | A1 | 10/2003 | Nakade et al. | |
| 2005/0231473 | A1* | 10/2005 | Kim | ........................ A63F 13/12 |
| | | | | 345/157 |
| 2007/0174111 | A1* | 7/2007 | Anderson | ........ G06Q 10/06311 |
| | | | | 705/7.13 |
| 2009/0089133 | A1* | 4/2009 | Johnson | ............. G06Q 10/1097 |
| | | | | 705/7.21 |
| 2009/0132930 | A1 | 5/2009 | Erikawa et al. | |
| 2010/0250304 | A1* | 9/2010 | Whitaker | ........... G06Q 10/0639 |
| | | | | 705/7.38 |
| 2010/0268571 | A1* | 10/2010 | Davies | ............. G06Q 10/06311 |
| | | | | 705/7.13 |
| 2010/0274617 | A1* | 10/2010 | Suomela | .......... G06Q 10/06311 |
| | | | | 705/7.15 |
| 2012/0166514 | A1* | 6/2012 | Mathew | ................. G06F 9/5083 |
| | | | | 709/201 |
| 2013/0223610 | A1* | 8/2013 | Kohler | ................ H04M 3/5238 |
| | | | | 379/265.02 |
| 2014/0195312 | A1* | 7/2014 | Ansel | ............... G06Q 10/06398 |
| | | | | 705/7.42 |

FOREIGN PATENT DOCUMENTS

CN           103347093 A      10/2013
WO         2010149285 A1    12/2010

OTHER PUBLICATIONS

The World Intellectual Property Organization (WIPO) International Search Report for PCT/CN2014/082742 dated Oct. 28, 2014.

* cited by examiner

METHOD, APPARATUS, AND COMMUNICATION SYSTEM FOR UPDATING USER DATA BASED ON A COMPLETION STATUS OF A COMBINATION OF BUSINESS TASK AND CONVERSATION TASK

CROSS-REFERENCES TO RELATED APPLICATIONS

This application is a continuation application of PCT Patent Application No. PCT/CN2014/082742, filed on Jul. 22, 2014, which claims priority to Chinese Patent Application No. 201310309057.5, filed on Jul. 22, 2013, the entire content of both of which is incorporated herein by reference.

FIELD OF THE DISCLOSURE

The present disclosure generally relates to the field of computer technology, and more particularly, relates to methods, apparatuses, and communication systems for updating user data based on a completion status of a combination of business task and conversation task.

BACKGROUND

With the development of Internet technology, more and more applications are based on Internet. A task server can provide a variety of business tasks for users to complete. The task server can update user data corresponding to a user according to the completion status of a business task of the user.

However, existing mechanisms of updating user data lack security, and it is difficult to promote business growth and to provide supports for the precipitation of user relationship chains.

BRIEF SUMMARY OF THE DISCLOSURE

According to various embodiments, there is provided a method for updating user data based on a completion status of a combination of business task and conversation task. In the method, business flow data and conversation flow data of a first user are obtained. Whether the first user has completed a preset first business task is determined according to the obtained business flow data, and whether the first user has completed a preset first conversation task is determined according to the obtained conversation flow data. After determining that the first user has completed the preset first business task and has completed the preset first conversation task, a user data update volume corresponding to a first task group is obtained, according to a mapping relationship between a task group and the user data update volume. The user data corresponding to the first user are updated according to the user data update volume corresponding to the first task group. The first task group includes the first business task and the first conversation task.

According to various embodiments, there is provided an apparatus for updating user data based on a completion status of a combination of business task and conversation task. The apparatus for updating user data based on a completion status of a combination of business task and conversation task includes: a flow obtaining unit, a task-completion determining unit, and a user-data updating unit.

The flow obtaining unit is configured to obtain the business flow data and the conversation flow data of the first user. The task-completion determining unit is configured to determine whether the first user has completed a preset first business task according to the obtained business flow data, and to determine whether the first user has completed a preset first conversation task according to the obtained conversation flow data. The user-data updating unit is configured to obtain a user data update volume corresponding to a first task group according to a mapping relationship between a task group and the user data update volume, and to update the user data corresponding to the first user according to the user data update volume corresponding to the first task group, after determining that the first user has completed the preset first business task and has completed the preset first conversation task, wherein the first task group includes the first business task and the first conversation task.

According to various embodiments, there is provided a communication system of updating user data. The communication system includes a task server and a flow data center. The task server includes: a flow obtaining unit, a task-completion determining unit, and a user-data updating unit.

The flow obtaining unit is configured to obtain business flow data and conversation flow data of a first user from the flow data center. The task-completion determining unit is configured to determine whether the first user has completed a preset first business task according to the obtained business flow data, and to determine whether the first user has completed a preset first conversation task according to the obtained conversation flow data. The user-data updating unit is configured to obtain a user data update volume corresponding to a first task group according to a mapping relationship between a task group and the user data update volume, and to update the user data corresponding to the first user according to the user data update volume corresponding to the first task group, after determining that the first user has completed the preset first business task and has completed the preset first conversation task, wherein the first task group comprises the first business task and the first conversation task.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 4-a depicts an exemplary apparatus of updating user information consistent with various disclosed embodiments;

FIG. 4-b depicts another exemplary apparatus of updating user information consistent with various disclosed embodiments;

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Various embodiments provide methods, apparatuses, and communication systems for updating user data based on a completion status of a combination of business task and conversation task to improve the security of updating user data, to promote business growth, and to provide supports for the precipitation of user relationship chains.

For example, a method for updating user data based on a completion status of a combination of business task and conversation task is provided. In the method, business flow data and conversation flow data of a first user are obtained. Whether the first user has completed a preset first business task is determined according to the obtained business flow data, and whether the first user has completed a preset first conversation task is determined according to the obtained conversation flow data. After determining that the first user has completed the preset first business task and has completed the preset first conversation task, a user data update volume corresponding to a first task group is obtained, according to a mapping relationship between a task group and the user data update volume. The user data corresponding to the first user are updated according to the user data update volume corresponding to the first task group. The first task group includes the first business task and the first conversation task.

Figure 1:
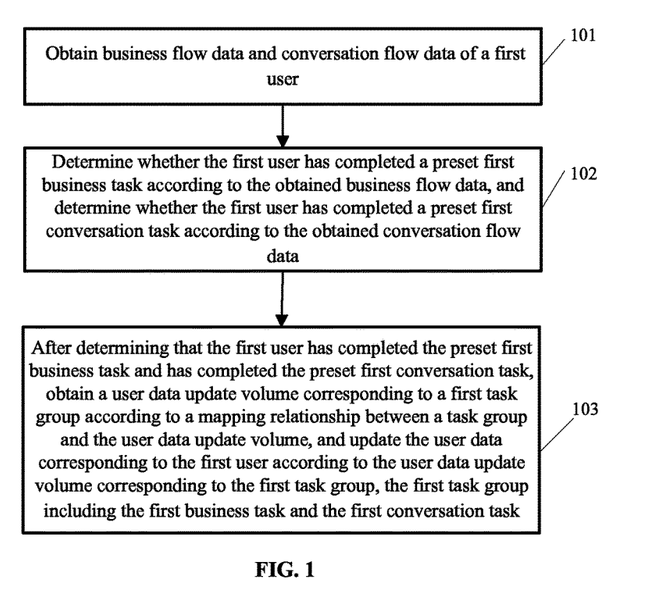
FIG. 1 depicts an exemplary method of updating user information consistent with various disclosed embodiments.

FIG. 1 depicts an exemplary method of updating user information consistent with various disclosed embodiments.

In Step 101, the business flow data and the conversation flow data of the first user are obtained.

In some embodiments, the business flow data of the first user may include a user business ID corresponding to the first user, the conversation flow data of the first user may include user conversation ID corresponding to the first user. Of course, the user business ID and the user conversation ID corresponding to the first user may or may not be the same, but both of them are used to represent the first user.

The conversation flow data of the first user may further include, e.g., the time of the conversation, length of the conversation, the user conversation ID of other users who had conversation with the first user, and/or any other suitable information.

In Step 102, whether the first user has completed the preset first business task is determined according to the obtained business flow data, and whether the first user has completed the preset first conversation task is determined according to the obtained conversation flow data.

The conversation in the present disclosure can be a voice conversation and/or video conversation. Conversation tasks (such as a first conversation task) can be voice conversation tasks and/or video conversation tasks. Conversation flow data can be voice conversation flow data and/or video conversation flow data.

In Step 103, after determining that the first user has completed the preset first business task and has completed the preset first conversation task, the user data update volume corresponding to the first task group is obtained according to the mapping relationship between the task group and the user data update volume. The user data corresponding to the first user are updated according to the user data update volume corresponding to the first task group. The first task group includes the first business task and the first conversation task.

In some embodiments, before the business flow data and the conversation flow data of the first user are obtained, the method can further include: descriptive information of the first business task group is sent to the client terminal used by the first user; and the mapping relationship between the first user and the first task group is recorded.

In some embodiments, before the business flow data and the conversation flow data of the first user are obtained, the method can further includes: descriptive information of the first business task group is sent to the client terminal used by the first user; and after receiving an accepting instruction of the first task group from the client terminal (the accepting instruction indicates the first user has accepted the first task group, of course, the acceptance of the first task group by the first user can be set as default directly), the mapping relationship between the first user and the first task group is recorded.

In some embodiments, the determining of whether the first user has completed the preset first conversation task according to the obtained conversation flow data includes: a number n of second users who have had a conversation with the first user is determined according to the obtained conversation flow data. The number n is a positive integer. The first user has not completed the preset first conversation task is determined, when any one second user from the number n of the second users does not belong to a same user group of the first user. The first user has completed the preset first conversation task is determined, when at least one second user from the number n of the second users belongs to the same user group of the first user and when the first user is determined to have a conversation with the at least one second user for a time length longer than a first threshold value. This thus facilitates a better precipitation of the user relationship chains.

In some embodiments, the obtaining of the business flow data and the conversation flow data of the first user includes: the business flow data and the conversation flow data of the first user are obtained, when triggered by a preset event (the preset event, for example, can be an arrival event of a preset triggering period, or a login event of a user, or other suitable events) or instructed by a user control instruction.

In some embodiments, the obtaining of the business flow data and the conversation flow data of the first user can include: the business flow data and the conversation flow data are obtained from a flow data center.

In some embodiments, after determining that the first user has completed the preset first business task and has completed the preset first conversation task, and the time period to complete the preset first business task and the time period to complete the preset first conversation task have overlaps (at this time, the first user can be considered to have completed the first task group), the user data update volume corresponding to the first task group is obtained according to the mapping relationship between the task group and the user data update volume. The user data corresponding to the first user are updated according to the user data update volume corresponding to the first task group. The first task group includes the first business task and the first conversation task.

In some embodiments, after determining that the first user has completed the preset first business task and has completed the preset first conversation task, and the difference between the time (or moment) to complete the preset first business task and the time to complete the preset first conversation task is less than a first threshold value (the first threshold value, for example, can be one hour, ten hours, twenty four hours, or other suitable time length; and at this time the first user can be considered to have completed the first task group), the user data update volume corresponding to the first task group is obtained, according to the mapping relationship between the task group and the user data update volume. The user data corresponding to the first user are updated according to the user data update volume corresponding to the first task group. The first task group includes the first business task and the first conversation task.

Of course, in other embodiments, there can be no limitation on the time for the first user to complete the preset first business task and the time for the first user to complete the first conversation task. As long as the first user has completed the preset first business task and the preset first conversation task, the first user can be considered to have completed the first task group.

It should be appreciated that under various application scenarios, user groups can have different forms. For example, a legion can be considered as a user group in some scenes of online games, an interest group can be considered as a user group in some scenes, and other scenes and so on. The user data, for example, can be user attribute data and/or user resource data.

It should be appreciated that under various application scenarios, business tasks can have different forms. For example, a game task can be considered as a business task in some cases of online games, a data upload/download task can be considered as a business task in some cases, a data format converting task can be considered as a business task in some cases, and so on.

It should be appreciated that various embodiments can be specifically implemented in a task server or other online servers. For example, the task server (or other online servers) can obtain the business flow data and the conversation flow data of a first user. Whether the first user has completed a preset first business task is determined according to the obtained business flow data, and whether the first user has completed a preset first conversation task is determined according to the obtained conversation flow data. After determining that the first user has completed the preset first business task and has completed the preset first conversation task, a user data update volume corresponding to a first task group is obtained, according to a mapping relationship between a task group and the user data update volume. The user data corresponding to the first user are updated according to the user data update volume corresponding to the first task group. The first task group includes the first business task and the first conversation task.

As disclosed, the business flow data and the conversation flow data of a first user are obtained. Whether the first user has completed a preset first business task is determined according to the obtained business flow data, and whether the first user has completed a preset first conversation task is determined according to the obtained conversation flow data. After determining that the first user has completed the preset first business task and has completed the preset first conversation task, a user data update volume corresponding to a first task group is obtained, according to a mapping relationship between a task group and the user data update volume. The user data corresponding to the first user are updated according to the user data update volume corresponding to the first task group. The first task group includes the first business task and the first conversation task.

The use of the task group (the task group includes not only business task, but also the conversation task), i.e. by combining the business task and the conversation task, can help to prevent cheating behaviors (for example, help to prevent users from using plug-ins to complete the task) during the task completion process, and can help to improve security of updating user data. In addition, the introduction of the conversation task increases the network traffic, which can help improve the utilization of network resources. In addition, the introduction of the conversation task can also help to promote business growth and provide supports for the precipitation of user relationship chains.

Figure 2:
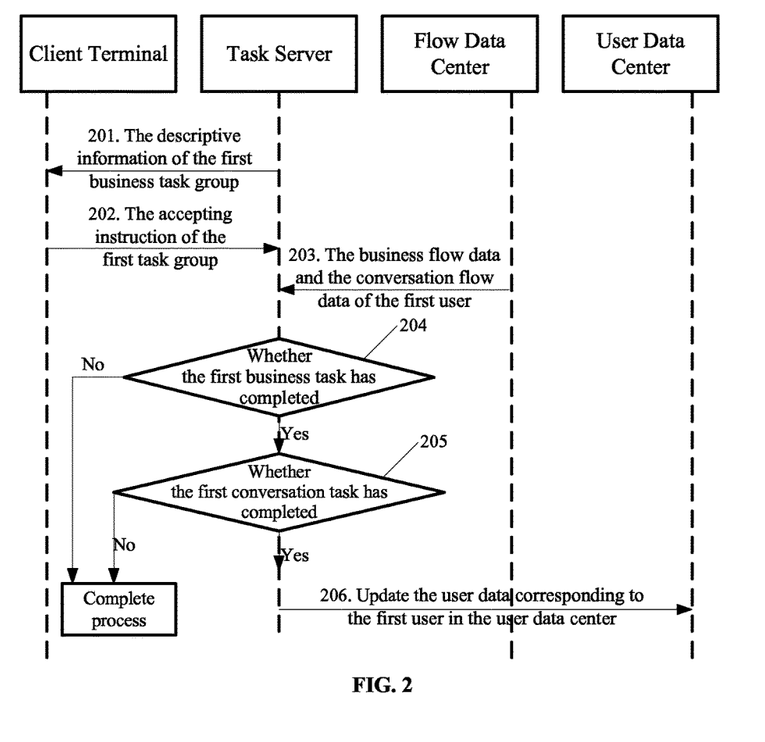
FIG. 2 depicts another exemplary method of updating user information consistent with various disclosed embodiments.

For a better understanding and implementation of the present disclosure, the following scenarios are introduced as examples in further details. For example, FIG. 2 depicts another exemplary method of updating user information consistent with various disclosed embodiments;

In Step 201, the task server sends descriptive information of the first business task group to the client terminal used by the first user. The first task group includes the first business task and the first conversation task. Of course, the first task group may also include other tasks.

In Step 202, the task server receives the accepting instruction of the first task group from the client terminal (the accepting instruction indicates the first user accepts the first task group), and records the mapping relationship between the first user and the first task group.

In Step 203, the task server obtains the business flow data and the conversation flow data of the first user from the flow data center.

In some embodiments, the business flow data of the first user may include a user business ID corresponding to the first user, the conversation flow data of the first user may include user conversation ID corresponding to the first user. Of course, the user business ID and the user conversation ID corresponding to the first user may or may not be the same, but both of them are used to represent the first user.

It should be appreciated that the conversation flow data of the first user may further include the time of the conversation, length of the conversation, the user conversation ID of other users who have had conversation with the first user, and/or other suitable information.

In some embodiments, the task server can obtain the business flow data and the conversation flow data of the first user that are obtained from the flow data center, when triggered by a preset event (the preset event, for example, can be an arrival event of a preset triggering period, or a login event of a user, or other suitable events) or instructed by a user control instruction.

In Step 204, the task server determines whether the first user has completed the preset first business task according to the obtained business flow data.

In Step 205, the task server determines whether the first user has completed the preset first conversation task according to the obtained conversation flow data.

It is not necessary to set specific order for the execution of Step 205 and Step 204. Both steps can be executed simultaneously or sequentially with any order.

In Step 206, after the task server determines that the first user has completed the preset first business task and has completed the preset first conversation task, the user data update volume corresponding to the first task group is obtained according to the mapping relationship between the task group and the user data update volume. The user data corresponding to the first user in the user data center are updated according to the user data update volume corresponding to the first task group.

In some embodiments, the determining of whether the first user has completed the preset first conversation task according to the obtained conversation flow data includes: a number n of second users who have had a conversation with the first user is determined according to the obtained conversation flow data. The number n is a positive integer. The first user has not completed the preset first conversation task is determined, when any one second user from the number n of the second users does not belong to a same user group of the first user. The first user has completed the preset first conversation task is determined, when at least one second user from the number n of the second users belongs to the same user group of the first user and when the first user is determined to have a conversation with the at least one second user for a time length longer than a first threshold value. This thus facilitates a better precipitation of the user relationship chains.

In some embodiments, after determining that the first user has completed the preset first business task and has completed the preset first conversation task, and the time period to complete the preset first business task and the time period to complete the preset first conversation task have overlaps (at this time, the first user can be considered to have completed the first task group), the user data update volume corresponding to the first task group is obtained, according to the mapping relationship between the task group and the user data update volume. The user data corresponding to the first user are updated according to the user data update volume corresponding to the first task group. The first task group includes the first business task and the first conversation task.

In some embodiments, after determining that the first user has completed the preset first business task and has completed the preset first conversation task, and the difference between the time (or moment) to complete the preset first business task and the time to complete the preset first conversation task is less than a first threshold value (the first threshold value, for example, can be one hour, ten hours, twenty four hours, or other suitable time length; and at this time the first user can be considered to have completed the first task group), the user data update volume corresponding to the first task group is obtained, according to the mapping relationship between the task group and the user data update volume. The user data corresponding to the first user are updated according to the user data update volume corresponding to the first task group. The first task group includes the first business task and the first conversation task.

Of course, in other embodiments, there can be no limitation on the time for the first user to complete the preset first business task and the time for the first user to complete the first conversation task. As long as the first user has completed the preset first business task and the preset first conversation task, the first user can be considered to have completed the first task group.

It should be appreciated that under various application scenarios, user groups can have different forms. For example, a legion can be considered as a user group in some cases of online games, an interest group can be considered as a user group in some cases, and so on. The user data, for example, can be user attribute data and/or user resource data.

It should be appreciated that under various application scenarios, business tasks can have different forms. For example, a game task can be considered as a business task in some cases of online games, a data upload/download task can be considered as a business task in some cases, a data format converting task can be considered as a business task in some cases, and so on.

It should be appreciated that any two of the task server, the flow data center, and the user data center can be integrated into one physical entity. Of course, the task server, the flow data center and the user data center may be integrated into one physical entity.

Thus, in present disclosure, the task server obtains the business flow data and the conversation flow data of a first user from the flow data center. Whether the first user has completed a preset first business task is determined according to the obtained business flow data, and whether the first user has completed a preset first conversation task is determined according to the obtained conversation flow data. After determining that the first user has completed the preset first business task and has completed the preset first conversation task, a user data update volume corresponding to a first task group is obtained, according to a mapping relationship between a task group and the user data update volume. The user data corresponding to the first user in the user data center are updated according to the user data update volume corresponding to the first task group. The first task group includes the first business task and the first conversation task.

As disclosed, the use of the task group (the task group includes not only business task, but also the conversation task), i.e. by combining the business task and the conversation task, can help to prevent cheating behaviors during the task completion process, and can help to improve security of updating user data. In addition, the introduction of the conversation task increases the network traffic, which can help to improve the utilization of network resources. In addition, the introduction of the conversation task can also help to promote business growth and provide supports for the precipitation of user relationship chains.

For a better understanding and implementation of the present disclosure, the following network game scenarios are introduced as examples in further details. Network games are also known as online games, referring to sustainable personalized multiplayer online games that use internet as the transmission medium, use personal computers and network game servers provided by operators as processing devices, use the software at game client terminals as information exchange interfaces, and aim to realize entertainment, leisure, communication and to obtain virtual achievement.

The following legion online games are used as examples. A legion can be considered as a user group. Both user A and user B are legion members. User A accepts a legion task (a legion task can be considered as a business task). User A invites user B for a voice communication via a game built-in voice service. User B accepts voice invitation. User B and user A then use voice room to communicate, and open a single game. Subsequently, both user A and user B can collect business tasks that meet completion requirements.

Assume both user A and user B are members of a same legion (i.e., considering user A and user B as in a same user group), but are not friends in the built-in voice software (such as QQTalk, or QT). After communication, user A and user B find they have common interests, and can add each other as voice software friends. This kind of task cannot only provide a new form of task, but also can precipitate the user relationship into voice software.

Figure 3:
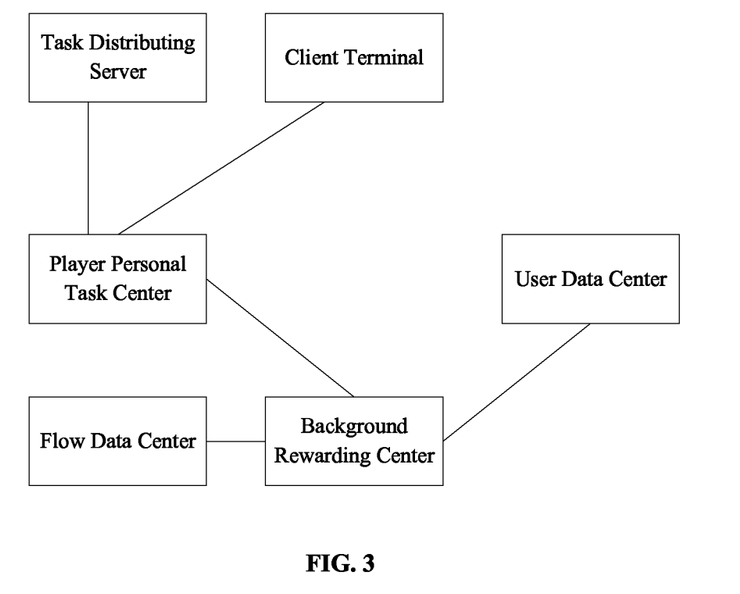
FIG. 3 depicts an exemplary internet structure consistent with various disclosed embodiments.

FIG. 3 depicts an exemplary internet structure consistent with various disclosed embodiments. The task distributing server sends the descriptive information of task group S to client terminal. Task group S can include legion task and voice conversation task. User A can receive the descriptive information of task group S sent by task distributing server.

The player personal task center can record the mapping relationship between user A and task group S.

The flow data center can synchronize the voice conversation flow data of the user in QT voice. Both user A and user B are members of the same legion. User A and user B play legion game together and have voice communication. The voice conversation flow data of user A and user B are recorded from the beginning of the legion game. Recorded voice conversation flow data can include: the voice room ID used by user A and user B, the starting time of the voice conversation of user A and user B, the IDs of participated games, the IDs of user A and user B, whether the ID of the voice conversation exists, the regional ID of the game location, and other information.

The flow data center can synchronize the game flow data of the user during the game (the game flow data can be considered as the business flow data). The game flow data can include game time, game regional ID, IDs of user A and user B, unique ID of a single game, etc.

The background rewarding center (the background rewarding center can be considered as a task server) obtains the game flow data and voice conversation flow data of user A from flow data center, determines whether user A has completed the game task according to the game flow data, determines whether user B (who had voice conversation with user A) belongs to the same legion as for user A according to the voice conversation flow data, determines whether the time length of the conversation between user A and user B is longer than the first threshold value according to the obtained voice conversation flow data, and then determines whether user A has completed the task group S.

The background rewarding center obtains the task group collected by user A via the player personal task center. After user A is determined to have completed the task group S according to the game flow data and the voice conversation flow data, the rewarding amount corresponding to the task group S is obtained according to the mapping relationship between the task group S and the rewarding amount (the rewarding amount can be considered as the user data update volume), the user data corresponding to user A in the user data center are updated according to the reward amount corresponding to the task group S (for example, update the user attributes (such as the grade, the experience value, etc.) corresponding to user A, and/or the user resource data (such as gold, weapons, armors, etc.)). Of course, when user A has not completed the task group S, the completion status of task group S does not change, and the background rewarding center does not issue corresponding rewards.

As seen in above exemplary scenario, the game operators can provide even more abundant operational activities; promote the precipitation of player relationship through voice communication. The task mechanism is used to determine the completion of the task group of the player. This mechanism provides better security because all the data are judged, compared, and verified by the background. When the player data are processed through centralized background process, better monitoring capability can be provided.

It should be appreciated that part or all of the task distributing server, the player personal task center, the flow data center, and the background rewarding center can be integrated into one physical entity. For example, the task distributing server and the player personal task center can be integrated into one physical entity.

The present disclosure also provides a method for distributing online game awards. In the method, the business flow data and the conversation flow data of the player are obtained.

Whether the player has completed the preset first game task is determined according to the obtained game flow data, and whether the player has completed a preset first conversation task is determined according to the obtained conversation flow data.

After determining that the player has completed the preset game task and has completed the preset first conversation task, the first game rewards corresponding to the first game task is obtained, according to the mapping relationship between the game task and the game rewards. The resource data and/or skill data corresponding to the player are updated according to the first game rewards.

The following example describes a scenario when the business task is a data updating task. The task server (or other network servers) can obtain the data updating flow data and the conversation flow data of a first user. Whether the first user has completed a preset first data updating task is determined according to the obtained data updating flow data. Whether the first user has completed a preset first conversation task is determined according to the obtained conversation flow data. After determining that the first user has completed the preset first data updating task and has completed the preset first conversation task, a user gold coin update volume corresponding to a first task group is obtained, according to a mapping relationship between a task group and the user gold update volume. The gold coin amount corresponding to the first user is updated according to the user gold coin update volume corresponding to the first task group. The first task group includes the first data updating task and the first conversation task.

The following example describes a scenario when the business task is a data downloading task. The task server (or other network servers) can obtain the data downloading flow data and the conversation flow data of a first user. Whether the first user has completed a preset first data downloading task is determined according to the obtained data downloading flow data is determined, and whether the first user has completed a preset first conversation task is determined according to the obtained conversation flow data. After determining that the first user has completed the preset first data downloading task and has completed the preset first conversation task, a user gold update volume corresponding to a first task group is obtained, according to a mapping relationship between a task group and the user gold update volume. The gold amount corresponding to the first user is updated according to the user gold update volume corresponding to the first task group. The first task group includes the first data downloading task and the first conversation task.

Figure 4A:
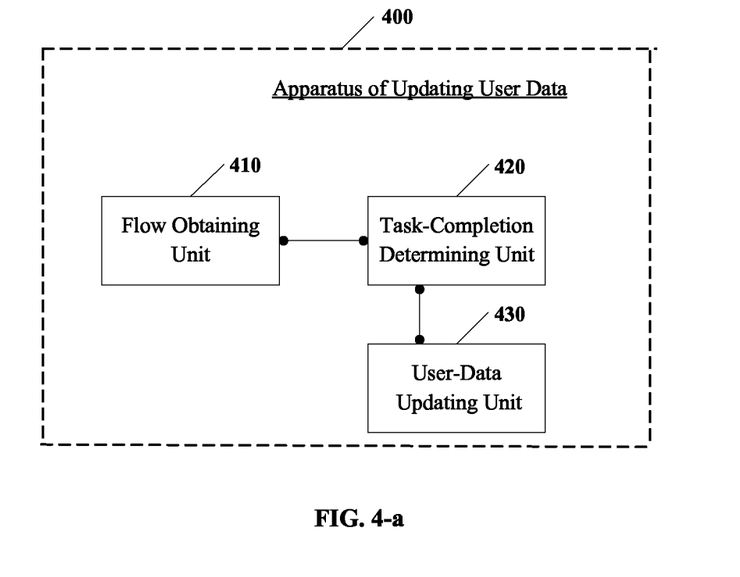

FIG. 4-*a* provides an exemplary apparatus for updating user data based on a completion status of a combination of business task and conversation task 400 consistent with various disclosed embodiments, including: a flow obtaining unit 410, a task-completion determining unit 420, and a user-data updating unit 430.

The flow obtaining unit 410 is configured to obtain the business flow data and the conversation flow data of the first user;

The task-completion determining unit 420 is configured to determine whether the first user has completed a preset first business task according to the obtained business flow data, and to determine whether the first user has completed a preset first conversation task according to the obtained conversation flow data;

The user-data updating unit 430 is configured to obtain a user data update volume corresponding to a first task group according to a mapping relationship between a task group and the user data update volume, and to update the user data corresponding to the first user according to the user data update volume corresponding to the first task group, after determining that the first user has completed the preset first business task and has completed the preset first conversation task, wherein the first task group includes the first business task and the first conversation task.

Figure 4B:
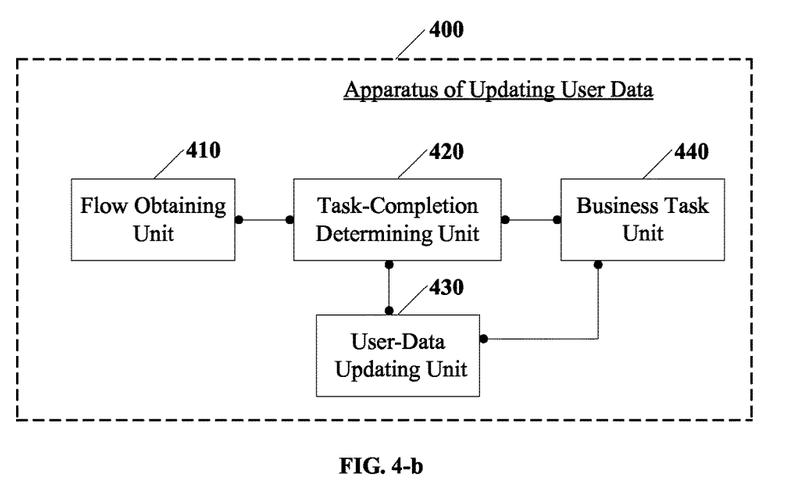

FIG. 4-b, in some embodiments, the apparatus for updating user data based on a completion status of a combination of business task and conversation task 400 can also include a business task unit 440.

The business task unit 440 is configured to, before the flow obtaining unit obtains the business flow data and the conversation flow data of the first user, send descriptive information of the first business task group to a client terminal used by the first user, and record a mapping relationship between the first user and the first task group.

In some embodiments, for determining whether the first user has completed the preset first conversation task according to the obtained conversation flow data, the task-completion determining unit 420 is configured to determine a number n of second users who have had a conversation with the first user according to the obtained conversation flow data. The first user is determined to have not completed the preset first conversation task when any one second user from the number n of the second users does not belong to a same user group of the first user. The first user is determined to have completed the preset first conversation task, when at least one second user from the number n of the second users belongs to the same user group of the first user and when the first user is determined to have a conversation with the at least one second user for a time length longer than a first threshold value.

In some embodiments, the flow obtaining unit 410 is configured to obtain the business flow data and the conversation flow data of the first user, when triggered by a preset event or instructed by a user control instruction.

In some embodiments, after the task-completion determining unit 420 determines that the first user has completed the preset first business task and has completed the preset first conversation task, and the time period to complete the preset first business task and the time period to complete the preset first conversation task have overlaps (at this time, the first user can be considered to have completed the first task group), the user-data updating unit 430 obtains the user data update volume corresponding to the first task group according to the mapping relationship between the task group and the user data update volume, and updates the user data corresponding to the first user according to the user data update volume corresponding to the first task group.

In some embodiments, after the task-completion determining unit 420 determines that the first user has completed the preset first business task and has completed the preset first conversation task, and the difference between the time (or moment) to complete the preset first business task and the time to complete the preset first conversation task is less than a first threshold value (the first threshold value, for example, can be one hour, ten hours, twenty four hours, or other suitable time length; and at this time, the first user can be considered to have completed the first task group), the user-data updating unit 430 obtains the user data update volume corresponding to the first task group, according to the mapping relationship between the task group and the user data update volume, and updates the user data corresponding to the first user according to the user data update volume corresponding to the first task group. The first task group includes the first business task and the first conversation task.

Of course, in present disclosure, there can be no limitation on the time for the first user to complete the preset first business task and the time for the first user to complete the first conversation task. As long as the first user has completed the preset first business task and the preset first conversation task, the first user can be considered to have completed the first task group.

It should be appreciated that under various application scenarios, user groups can have different forms; for example, a legion can be considered as a user group in some scenes of online games, an interest group can be considered as a user group in some scenes, and other scenes and so on. The user data, for example, can be user attribute data and/or user resource data.

It should be appreciated that under various application scenarios, business tasks can have different forms; for example, a game task can be considered as a business task in some scenes of online games, a data upload/download task can be considered as a business task in some scenes, a data format converting task can be considered as a business task in some scenes, and other scenes and so on.

It should be appreciated that any two of the task server, the flow data center, and the user data center can form one physical entity. Of course, the task server, the flow data center and the user data center may also form one physical entity.

It should be appreciated that the function of each function unit in the apparatus for updating user data based on a completion status of a combination of business task and conversation task 400 can be implemented by above embodiments. The detailed implementation can be referred to related description in above embodiments.

Thus, in present disclosure, the apparatus for updating user data based on a completion status of a combination of business task and conversation task 400 obtains the business flow data and the conversation flow data of a first user. Whether the first user has completed a preset first business task is determined according to the obtained business flow data, and whether the first user has completed a preset first conversation task is determined according to the obtained conversation flow data. After determining that the first user has completed the preset first business task and has completed the preset first conversation task, a user data update volume corresponding to a first task group is obtained, according to a mapping relationship between a task group and the user data update volume. The user data corresponding to the first user in the user data center are updated according to the user data update volume corresponding to the first task group. The first task group includes the first business task and the first conversation task.

As disclosed, the use of the task group (the task group includes not only business task, but also the conversation task), i.e. by combining the business task and the conversation task, can help to prevent cheating behaviors during the task completion process, and can help to improve security of updating user data. In addition, the introduction of the conversation task increases the network traffic, which can help to improve the utilization of network resources. In addition, the introduction of the conversation task can also help to promote business growth and provide supports for the precipitation of user relationship chains.

Figure 5:
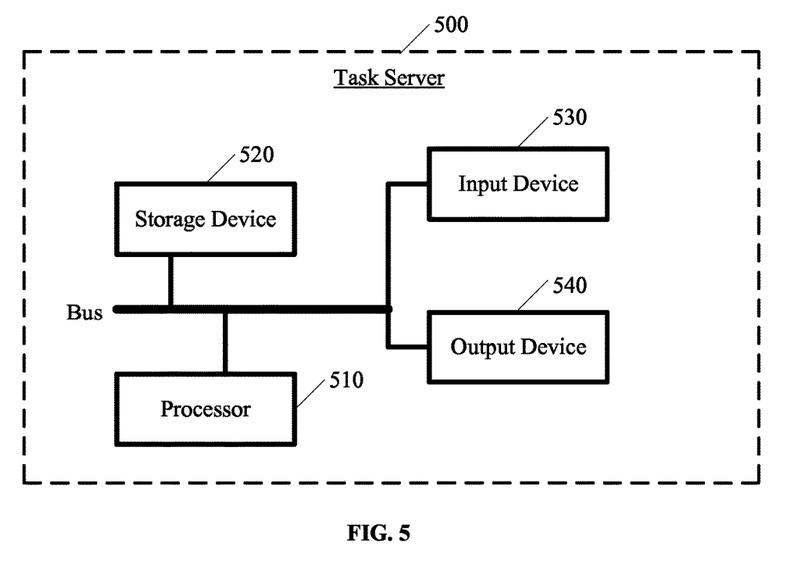
FIG. 5 depicts an exemplary task server consistent with various disclosed embodiments.

FIG. 5 provides an exemplary task server 500 consistent with various disclosed embodiments, including: a processor 510, a storage device 520, an input device 530 and an output device 540.

The number of processor 510 in the task server 500 can be one or more. FIG. 5 shows one processor as an example. In some embodiments, the processor 510, the storage device 520, the input device 530 and the output device 540 can be connected by a bus or other means. FIG. 5 uses a bus connection as example.

The storage device 520 (e.g., a non-transitory computer-readable storage medium) can be used for storing software programs and modules. By running software programs and modules stored in the storage device 520, the processor 510 can perform various functional applications and data processing to execute various functions of the task server 500. The storage device 520 can include a program storage area and a data storage area. The program storage area can store the operating system, applications (such as sound playback, image playback, etc.) required by at least one function. In addition, storage device 520 can include a high-speed random access memory and a non-volatile memory. For example, the storage device 520 can include at least one disk memory, flash memory, and/or other volatile solid-state memory elements. The input device 530 can be used to receive inputted numeric or character information, and to generate signal input of keyboard related to the user settings and function controls of the task server 500.

The processor 510 can execute the following steps: the business flow data and the conversation flow data of the first user are obtained. Whether the first user has completed the preset first business task is determined according to the obtained business flow data, and whether the first user has completed the preset first conversation task is determined according to the obtained conversation flow data. After determining that the first user has completed the preset first business task and has completed the preset first conversation task, the user data update volume corresponding to the first task group is obtained, according to the mapping relationship between the task group and the user data update volume. The user data corresponding to the first user are updated according to the user data update volume corresponding to the first task group. The first task group includes the first business task and the first conversation task.

In some embodiments, the business flow data of the first user may include a user business ID corresponding to the first user, the conversation flow data of the first user may include user conversation ID corresponding to the first user. Of course, the user business ID and the user conversation ID corresponding to the first user may or may not be the same, but both of them are used to represent the first user.

It should be appreciated that the conversation flow data of the first user may further include the time of the conversation, length of the conversation, the user conversation ID of other users who had conversation with the first user, of course, may also include other information.

In some embodiments, before the business flow data and the conversation flow data of the first user are obtained, the method can further includes: descriptive information of the first business task group is sent to the client terminal used by the first user; and the mapping relationship between the first user and the first task group is recorded.

In some embodiments, before the business flow data and the conversation flow data of the first user are obtained, the method can further includes: the processor 510 sends descriptive information of the first business task group to the client terminal used by the first user; and after receiving an accepting instruction of the first task group from the client terminal (the accepting instruction indicates the first user accepts the first task group, of course, the acceptance of the first task group by the first user can be set as default directly), the mapping relationship between the first user and the first task group is recorded.

In some embodiments, that the processor 510 determines whether the first user has completed the preset first conversation task according to the obtained conversation flow data includes: a number n of second users who have had a conversation with the first user is determined according to the obtained conversation flow data. The number n is a positive integer. The first user has not completed the preset first conversation task is determined, when any one second user from the number n of the second users does not belong to a same user group of the first user. The first user has completed the preset first conversation task is determined, when at least one second user from the number n of the second users belongs to the same user group of the first user and when the first user is determined to have a conversation with the at least one second user for a time length longer than a first threshold value. This thus facilitates a better precipitation of the user relationship chains.

In some embodiments, that the processor 510 obtains the business flow data and the conversation flow data of the first user includes: the business flow data and the conversation flow data of the first user are obtained, when triggered by a preset event (the preset event, for example, can be an arrival event of a preset triggering period, or a login event of a user, or other suitable events) or instructed by a user control instruction.

In some embodiments, that the processor 510 obtains the business flow data and the conversation flow data of the first user can include: the business flow data and the conversation flow data are obtained from a flow data center.

In some embodiments, after the processor 510 determines that the first user has completed the preset first business task and has completed the preset first conversation task, and the time period to complete the preset first business task and the time period to complete the preset first conversation task have overlaps (at this time, the first user can be considered to have completed the first task group), the user data update volume corresponding to the first task group is obtained, according to the mapping relationship between the task group and the user data update volume. The user data corresponding to the first user are updated according to the user data update volume corresponding to the first task group. The first task group includes the first business task and the first conversation task.

In some embodiments, after the processor 510 determines that the first user has completed the preset first business task and has completed the preset first conversation task, and the difference between the time (or moment) to complete the preset first business task and the time to complete the preset first conversation task is less than a first threshold value (the first threshold value, for example, can be one hour, ten hours, twenty four hours, or other suitable time length; and at this time, the first user can be considered to have completed the first task group), the user data update volume corresponding to the first task group is obtained, according to the mapping relationship between the task group and the user data update volume. The user data corresponding to the first user are updated according to the user data update volume corresponding to the first task group. The first task group includes the first business task and the first conversation task.

Of course, in present disclosure, there can be no limitation on the time for the first user to complete the preset first business task and the time for the first user to complete the first conversation task. As long as the first user has completed the preset first business task and the preset first conversation task, the first user can be considered to have completed the first task group.

It should be appreciated that under various application scenarios, user groups can have different forms; for example, a legion can be considered as a user group in some scenes of online games, an interest group can be considered as a user group in some scenes, and other scenes and so on. The user data, for example, can be user attribute data and/or user resource data.

It should be appreciated that under various application scenarios, business tasks can have different forms; for example, a game task can be considered as a business task in some scenes of online games, a data upload/download task can be considered as a business task in some scenes, a data format converting task can be considered as a business task in some scenes, and other scenes and so on.

Thus, in present disclosure, the task server 500 obtains the business flow data and the conversation flow data of a first user. Whether the first user has completed a preset first business task is determined according to the obtained business flow data, and whether the first user has completed a preset first conversation task (for example the voice conversation task and/or video conversation task) is determined according to the obtained conversation flow data. After determining that the first user has completed the preset first business task and has completed the preset first conversation task, a user data update volume corresponding to a first task group is obtained according, to a mapping relationship between a task group and the user data update volume. The user data corresponding to the first user are updated according to the user data update volume corresponding to the first task group. The first task group includes the first business task and the first conversation task.

As disclosed, the use of the task group (the task group includes not only business task, but also the conversation task), i.e. by combining the business task and the conversation task, can help to prevent cheating behaviors during the task completion process, and can help to improve security of updating user data. In addition, the introduction of the conversation task increases the network traffic, which can help to improve the utilization of network resources. In addition, the introduction of the conversation task can also help to promote business growth and provide supports for the precipitation of user relationship chains.

Figure 6:
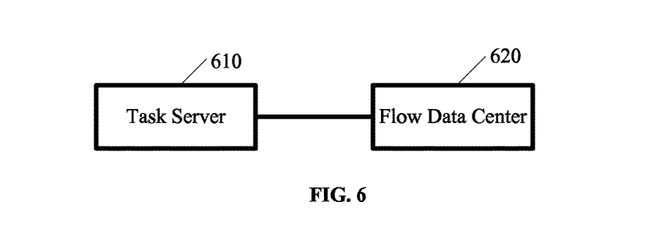
FIG. 6 depicts an exemplary communication system consistent with various disclosed embodiments.

FIG. 6 provides an exemplary communication system consistent with various disclosed embodiments, including: a task server 610, and a flow data center 620.

The task server 610 can be used to obtain the business flow data and the conversation flow data of the first user from the flow data center 620. Whether the first user has completed the preset first business task is determined according to the obtained business flow data, and whether the first user has completed the preset first conversation task is determined according to the obtained conversation flow data. After determining that the first user has completed the preset first business task and has completed the preset first conversation task, the user data update volume corresponding to the first task group is obtained, according to the mapping relationship between the task group and the user data update volume. The user data corresponding to the first user are updated according to the user data update volume corresponding to the first task group. The first task group includes the first business task and the first conversation task.

In some embodiments, the business flow data of the first user may include a user business ID corresponding to the first user, the conversation flow data of the first user may include user conversation ID corresponding to the first user. Of course, the user business ID and the user conversation ID corresponding to the first user may or may not be the same, but both of them are used to represent the first user.

It should be appreciated that the conversation flow data of the first user may further include the time of the conversation, length of the conversation, the user conversation ID of other users who had conversation with the first user, of course, may also include other information.

In some embodiments, the task server 610 can also be used to, before the business flow data and the conversation flow data of the first user are obtained from the flow data center 620, send descriptive information of the first business task group to the client terminal used by the first user, and records the mapping relationship between the first user and the first task group.

In some other embodiments of the present disclosure, the task server 610 can also be used to, before the business flow data and the conversation flow data of the first user from the flow data center 620 are obtained, sends the descriptive information of the first business task group to the client terminal used by the first user. And after receiving an accepting instruction of the first task group from the client terminal (the accepting instruction indicates the first user accepts the first task group, of course, the acceptance of the first task group by the first user can be set ad default directly), the task server 610 records the mapping relationship between the first user and the first task group.

In some embodiments, for determining whether the first user has completed the preset first conversation task according to the obtained conversation flow data includes, the task server 610 can be used to determine a number n of second users who have had a conversation with the first user according to the obtained conversation flow data. The number n is a positive integer. The first user has not completed the preset first conversation task is determined, when any one second user from the number n of the second users does not belong to a same user group of the first user. The first user has completed the preset first conversation task is determined, when at least one second user from the number n of the second users belongs to the same user group of the first user and when the first user is determined to have a conversation with the at least one second user for a time length longer than a first threshold value. This thus facilitates a better precipitation of the user relationship chains.

In some embodiments, for obtaining of the business flow data and the conversation flow data of the first user includes, the task server 610 can be used to obtain the business flow data and the conversation flow data of the first user, when triggered by a preset event (the preset event, for example, can be an arrival event of a preset triggering period, or a login event of a user, or other suitable events) or instructed by a user control instruction.

In some embodiments, after the task server 610 determines that the first user has completed the preset first business task and has completed the preset first conversation task, and the time period to complete the preset first business task and the time period to complete the preset first conversation task have overlaps (at this time, the first user can be considered to have completed the first task group), the user data update volume corresponding to the first task group is obtained, according to the mapping relationship between the task group and the user data update volume. The user data corresponding to the first user are updated according to the user data update volume corresponding to the first task group. The first task group includes the first business task and the first conversation task.

In some embodiments, after the task server 610 determines that the first user has completed the preset first business task and has completed the preset first conversation task, and the difference between the time (or moment) to complete the preset first business task and the time to complete the preset first conversation task is less than a first threshold value (the first threshold value, for example, can be one hour, ten hours, twenty four hours, or other suitable time length; and at this time, the first user can be considered to have completed the first task group), the user data update volume corresponding to the first task group is obtained, according to the mapping relationship between the task group and the user data update volume The user data corresponding to the first user are updated according to the user data update volume corresponding to the first task group. The first task group includes the first business task and the first conversation task.

Of course, in present disclosure, there can be no limitation on the time for the first user to complete the preset first business task and the time for the first user to complete the first conversation task. As long as the first user has completed the preset first business task and the preset first conversation task, the first user can be considered to have completed the first task group.

It should be appreciated that under various application scenarios, user groups can have different forms; for example, a legion can be considered as a user group in some scenes of online games, an interest group can be considered as a user group in some scenes, and other scenes and so on. The user data, for example, can be user attribute data and/or user resource data.

Thus, in present disclosure, the task server 610 obtains the business flow data and the conversation flow data of a first user from the flow data center 620. Whether the first user has completed a preset first business task is determined according to the obtained business flow data, and whether the first user has completed a preset first conversation task is determined according to the obtained conversation flow data. After determining that the first user has completed the preset first business task and has completed the preset first conversation task, a user data update volume corresponding to a first task group is obtained, according to a mapping relationship between a task group and the user data update volume. The user data corresponding to the first user are updated according to the user data update volume corresponding to the first task group. The first task group includes the first business task and the first conversation task (for example the voice conversation task and/or video conversation task).

As disclosed the use of the task group (the task group includes not only business task, but also the conversation task), i.e. by combining the business task and the conversation task, can help to prevent cheating behaviors during the task completion process, and can help to improve security of updating user data. In addition, the introduction of the conversation task increases the network traffic, which can help to improve the utilization of network resources. In addition, the introduction of the conversation task can also help to promote business growth and provide supports for the precipitation of user relationship chains.

Figure 7:
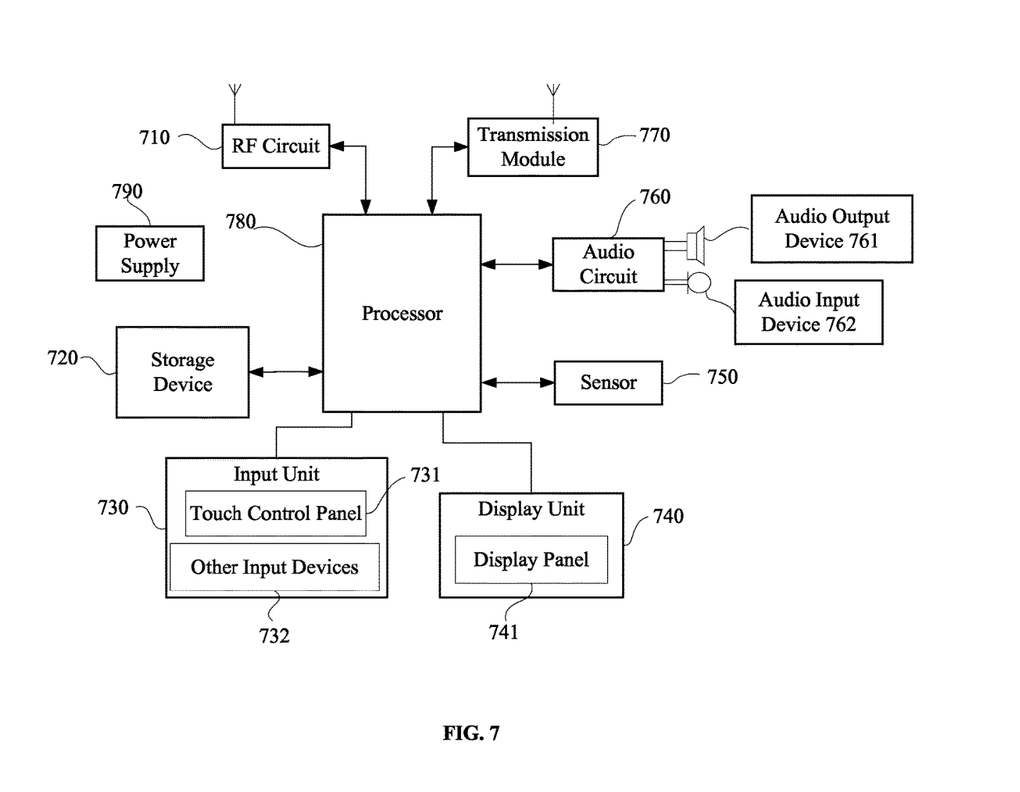
FIG. 7 depicts an exemplary client terminal consistent with various disclosed embodiments.

FIG. 7 provides an exemplary client terminal consistent with various disclosed embodiments. For illustration purpose, only certain portions are disclosed for the apparatus, although the disclosed apparatus can be used to implement all possible steps of the method for updating user data based on a completion status of a combination of business task and conversation task. The exemplary client terminal 700 in FIG. 7 can include a PDA (personal digital assistant), a POS (point of sales), a tablet computer, a car-carried-computer, a mobile phone, or any desired terminal device. The following client terminal 700 uses the mobile phone as an example for illustration:

FIG. 7 depicts at least a portion of an exemplary mobile phone related to the terminal. As shown in FIG. 7, the exemplary mobile phone 700 can include an RF (Radio Frequency) circuit 710, a storage device 720 including one or more computer-readable storage media, an input unit 730, a WiFi (wireless fidelity) module 770, a display unit 740, a sensor 750, an audio circuit 760, a processor 780 including one or more processing cores, a power supply 790, and/or other components. In various embodiments, the terminal(s) described herein can include more or less components as depicted in FIG. 7. Certain components/parts can be omitted, combined, replaced, and/or added.

The RF circuit 710 can be used to send/receive information or send/receive signal during communication. In particular, after receiving downlink information from a base station, such information can be processed by the one or more processors 780. Further, the data related to the uplink can be sent to the base station. Generally, the RF circuit 710 can include, but be not limited to, an antenna, at least one amplifier, a tuner, one or more oscillators, a user identity module (SIM) card, a transceiver, a coupler, LNA (i.e., Low Noise Amplifier), a duplexer, etc. In addition, the RF circuit 710 can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service).

The storage device 720 can be used for storing software programs and modules, such as those software programs and modules corresponding to the terminal and the third party service provider as described in FIGS. 1-6 for updating user data. By running software programs and modules stored in the storage device 720, the processor 780 can perform various functional applications and data processing to update user data. The storage device 720 can include a program storage area and a data storage area. The program storage area can store the operating system, applications (such as sound playback, image playback, etc.) required by at least one function. The data storage area can store data (such as audio data, phone book, etc.) created when using the terminal. In addition, the storage device 720 can include a high-speed random access memory and a non-volatile memory. For example, the storage device 720 can include at least one disk memory, flash memory, and/or other volatile solid-state memory elements. Accordingly, the storage device 720 can further include a memory controller to provide the processor 780 and the input unit 730 with access to the storage device 720.

The input unit 730 can be used to receive inputted numeric or character information, and to generate signal input of keyboard, mouse, joystick, and trackball or optical signal input related to the user settings and function controls of the mobile phone 700. Specifically, the input unit 730 can include a touch control panel 731 and other input device(s) 732. The touch-sensitive surface 731, also known as a touch screen or touch panel, can collect touch operations that a user conducts on or near the touch-sensitive surface 731. For example, a user can use a finger, a stylus, and any other suitable object or attachment on the touch-sensitive surface 731 or on an area near the touch-sensitive surface 731. The touch-sensitive surface 731 can drive a connecting device based on a preset program. Optionally, the touch control panel 731 can include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 780, and receive commands sent from the processor 780 to execute. Furthermore, the touch control panel 731 can be realized by resistive, capacitive, infrared surface acoustic wave, and/or other types of surface touch. In addition to the touch control panel 731, the input unit 730 can also include other input device(s) 732. Specifically, the other input device(s) 732 can include, but be not limited to, a physical keyboard, function keys (such as volume control buttons, switch buttons, etc.), a trackball, a mouse, an operating lever, or combinations thereof.

The display unit 740 can be used to display information inputted by the user, information provided to the user, and a variety of graphical user interfaces of the terminal 700. These graphical user interfaces can be formed by images, text, icons, videos, and/or any combinations thereof. The display unit 740 can include a display panel 741 configured by, e.g., LCD (Liquid Crystal Display), OLED (Organic Light-Emitting Diode), etc. Further, the touch control panel 731 can cover the display panel 741. When the touch control panel 731 detects a touch operation on or near the touch sensitive surface, the touch operation can be sent to the processor 780 to determine a type of the touch operation. Accordingly, the processor 780 can provide visual output on the display panel 741. Although in FIG. 7 the touch-sensitive surface 731 and the display panel 741 are shown as two separate components to achieve input and output functions, in some embodiments, the touch control panel 731 and the display panel 741 can be integrated to perform input and output functions.

The mobile phone 700 in FIG. 7 can further include at least one sensor 750, such as optical sensors, motion sensors, and other suitable sensors. Specifically, the optical sensors can include an ambient optical sensor and a proximity sensor. The ambient optical sensor can adjust brightness of the display panel 741 according to the brightness of ambient light. The proximity sensor can turn off the display panel 741 and/or turn on backlighting, when the terminal 700 moves to an ear. As a type of motion sensor, a gravity sensor can detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), and/or vibration recognition related functions (e.g., pedometer, percussion, etc.). The terminal 700 can also be configured with, e.g., a gyroscope, a barometer, a hygrometer, a thermometer, an infrared sensor, and/or other sensors.

The audio circuit 760 can include a speaker 761; a microphone 762 and can provide an audio interface between the user and the mobile phone. The audio circuit 760 can transmit an electrical signal converted from the received audio data to the speaker 761 to convert into audio signal output. On the other hand, the microphone 762 can convert the collected sound signal to an electrical signal, which can be received by the audio circuit 760 to convert into audio data. The audio data can be output to the processor 780 for processing and then use the RF circuit 710 to transmit to, e.g., another mobile phone. Alternatively, the audio data can be output to the storage device 720 for further processing. The audio circuit 760 can also include an earplug jack to provide communications between the peripheral headset and the terminal 700.

The WiFi is a short-range wireless transmission technology. The mobile phone can use the WiFi module 770 to help users send/receive emails, browse websites, access streaming media, etc. The WiFi module 770 can provide users with a wireless or wired broadband Internet access. In various embodiments, the WiFi module 770 can be configured within or outside of the mobile phone 700 as depicted in FIG. 7.

The processor 780 can be a control center of the mobile phone 700: using a variety of interfaces and circuits to connect various parts, e.g., within a mobile phone; running or executing software programs and/or modules stored in the storage device 720; calling the stored data in the storage device 720; and/or performing various functions and data processing of the mobile phone 700, e.g., to monitor the overall mobile phone. Optionally, the processor 780 can include one or more processing cores. In an exemplary embodiment, the processor 780 can integrate application processor with modulation and demodulation processor. The application processor is mainly used to process operating system, user interface, and applications. The modulation and demodulation processor is mainly used to deal with wireless communications. In various embodiments, the modulation and demodulation processor may or may not be integrated into the processor 780.

The mobile phone 700 can further include a power supply 790 (such as a battery) to power various components of the terminal. In an exemplary embodiment, the power supply can be connected to the processor 780 via the power management system, and thus use the power management system to manage charging, discharging, and/or power management functions. The power supply 790 can also include one or more DC or AC power supplies, a recharging system, a power failure detection circuit, a power converter or inverter, a power status indicator, and/or any other suitable components. Although not shown in FIG. 7, the mobile phone 700 can further include a camera, a Bluetooth module, etc. without limitations.

The present disclosure also provides a computer storage medium. The computer storage medium can store some programs. The programs execute some or all of the steps of updating user data consistent with various embodiments.

It should be noted that, in the present disclosure each embodiment is progressively described, i.e., each embodiment is described and focused on difference between embodiments. Similar and/or the same portions between various embodiments can be referred to with each other. In addition, exemplary apparatus (e.g., a server) is described with respect to corresponding methods.

The disclosed methods, and/or apparatus can be implemented in a suitable computing environment. The disclosure can be described with reference to symbol(s) and step(s)

performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

As used herein, the term "module" can be software objects executed on a computing system. A variety of components described herein including elements, modules, units, engines, and services can be executed in the computing system. The apparatus, devices, and/or methods can be implemented in a software manner. Of course, the apparatus, devices, and/or methods can be implemented using hardware. All of which are within the scope of the present disclosure.

In various embodiments, the disclosed modules can be configured in one apparatus (e.g., a processing unit) or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

In the specification, claims, and drawings of the present disclosure, terms such as "first", "second", "third", "fourth", etc. are used to distinguish similar objects, which are not necessarily used to describe specific order or priority. It should be appreciated that data described by such terms can be used interchangeably under appropriate circumstances, so that, the present disclosure can include examples executed in orders other than the orders illustrated or described herein. In addition, terms "comprising" and "including" or any other variants thereof are intended to cover non-exclusive inclusion, such that the process, method, article, or apparatus containing a number of elements, but also other elements that are not expressly listed; or further include inherent elements of the process, method, article or apparatus. Without further restrictions, the statement "include a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In the disclosed methods, apparatus, and communication systems for updating user data based on a completion status of a combination of business task and conversation task, the business flow data and the conversation flow data of a first user is obtained. Whether the first user has completed a preset first business task is determined according to the obtained business flow data, and whether the first user has completed a preset first conversation task is determined according to the obtained conversation flow data. After determining that the first user has completed the preset first business task and has completed the preset first conversation task, a user data update volume corresponding to a first task group is obtained, according to a mapping relationship between a task group and the user data update volume. The user data corresponding to the first user are updated according to the user data update volume corresponding to the first task group. The first task group includes the first business task and the first conversation task.

The disclosed methods, apparatus, and communication systems for updating user data based on a completion status of a combination of business task and conversation task use a mechanism of the task group (the task group includes not only business task, but also the conversation task). This mechanism of combining the business task and the conversation task, can help to prevent cheating behaviors (for example, help to prevent users from using plug-ins to complete the task) during the task completion process, and can help to improve security of updating user data. In addition, the introduction of the conversation task increases the network traffic, which can help improve the utilization of network resources. In addition, the introduction of the conversation task can also help to promote business growth and provide supports for the precipitation of user relationship chains.

What is claimed is:

1. A method for updating user data by a task server based on a completion status of a combination of business task and conversation task to improve security of updating the user data, the task server comprising one or more processors and a non-transitory computer-readable storage medium, comprising:

providing, by the task server, a task group including a plurality of tasks for a first user to complete;

obtaining, by the task server, business flow data and conversation flow data of the first user;

determining, by the task server, whether the first user has completed a preset first business task according to the obtained business flow data, and whether the first user has completed a preset first conversation task according to the obtained conversation flow data; and in response to determining the completion status of the combination of the preset first business task and preset first conversation task, and a difference between a moment to complete the preset first business task and a moment to complete the preset first conversation task is less than a second threshold value, obtaining, by the task server, a user data update volume corresponding to a first task group according to a mapping relationship between the task group and the user data update volume, and updating, by the task server, the user data corresponding to the first user according to the user data update volume corresponding to the first task group, such that the security of updating the user data is improved, wherein the first task group comprises the first business task and the first conversation task.

2. The method according to claim 1, wherein, before the obtaining of the business flow data and the conversation flow data of the first user, the method further comprises:
sending descriptive information of the first business task group to a client terminal used by the first user, and recording a mapping relationship between the first user and the first task group.

3. The method according to claim 2, wherein the determining of whether the first user has completed the preset first conversation task according to the obtained conversation flow data comprises:
determining a number n of second users who have had a conversation with the first user according to the obtained conversation flow data, wherein the number n is a positive integer;
determining the first user has not completed the preset first conversation task when any one second user from the number n of the second users does not belong to a same user group of the first user; and
determining the first user has completed the preset first conversation task, when at least one second user from the number n of the second users belongs to the same user group of the first user and when the first user is determined to have a conversation with the at least one second user for a time length longer than a first threshold value.

4. The method according to claim 3, wherein the obtaining of the business flow data and the conversation flow data of the first user comprises:
obtaining the business flow data and the conversation flow data of the first user, when triggered by a preset event or instructed by a user control instruction.

5. The method according to claim 4, wherein the obtaining of the business flow data and the conversation flow data of the first user comprises:
obtaining the business flow data and the conversation flow data from a flow data center.

6. An apparatus for updating user data based on a completion status of a combination of business task and conversation task to improve security of updating the user data, comprising one or more processors and a non-transitory computer-readable storage medium having instructions stored thereon, the instructions executed by the one or more processors and comprising:
a flow obtaining unit, configured to obtain business flow data and conversation flow data of a first user;
a task-completion determining unit, configured to determine whether the first user has completed a preset first business task according to the obtained business flow data, and to determine whether the first user has completed a preset first conversation task according to the obtained conversation flow data; and a user-data updating unit, in response to determining the completion status of the combination of the preset first business task and preset first conversation task, and a difference between a moment to complete the preset first business task and a moment to complete the preset first conversation task is less than a second threshold value, configured to obtain a user data update volume corresponding to a first task group according to a mapping relationship between a task group and the user data update volume, and to update the user data corresponding to the first user according to the user data update volume corresponding to the first task group, such that the security of updating the user data is improved, wherein the first task group comprises the first business task and the first conversation task.

7. The apparatus according to claim 6, further comprising:
a business task unit configured to, before the flow obtaining unit obtains the business flow data and the conversation flow data of the first user, send descriptive information of the first business task group to a client terminal used by the first user, and record a mapping relationship between the first user and the first task group.

8. The apparatus according to claim 7, wherein for determining whether the first user has completed the preset first conversation task according to the obtained conversation flow data, the task-completion determining unit is configured to:
determine a number n of second users who have had a conversation with the first user according to the obtained conversation flow data, wherein the number n is a positive integer;
determine the first user has not completed the preset first conversation task when any one second user from the number n of the second users does not belong to a same user group of the first user; and
determine the first user has completed the preset first conversation task, when at least one second user from the number n of the second users belongs to the same user group of the first user and when the first user is determined to have a conversation with the at least one second user for a time length longer than a first threshold value.

9. The apparatus according to claim 8, wherein the flow obtaining unit is configured to:
obtain the business flow data and the conversation flow data of the first user, when triggered by a preset event or instructed by a user control instruction.

10. The method according to claim 1, wherein, before the obtaining of the business flow data and the conversation flow data of the first user, the method further comprises:
sending descriptive information of the first business task group to a client terminal used by the first user, receiving an accepting instruction of the first task group from the client terminal, and recording a mapping relationship between the first user and the first task group.

11. The method according to claim 1, wherein:
the preset first business task includes a game task, a data upload/download task, or a data format converting task.

12. The method according to claim 1, wherein:
a time period to complete the preset first business task and a time period to complete the preset first conversation task have overlaps.

13. The method according to claim 1, wherein:
the business flow data of the first user includes a user business ID corresponding to the first user, and the conversation flow data of the first user includes user conversation ID corresponding to the first user.

14. The method according to claim 13, wherein:
the conversation flow data of the first user further includes the time of a conversation, a length of the conversation, the user conversation ID of other users who had conversation with the first user.

15. A communication system for updating user data based on a completion status of a combination of business task and conversation task, comprising:
a task server and a flow data center, wherein the task server comprises one or more processors and a non-transitory computer-readable storage medium having instructions stored thereon, the instructions executed by the one or more processors and comprising:
a flow obtaining unit, configured to obtain business flow data and conversation flow data of a first user from the flow data center;
a task-completion determining unit, configured to determine whether the first user has completed a preset first business task according to the obtained business flow data, and to determine whether the first user has completed a preset first conversation task according to the obtained conversation flow data; and
a user-data updating unit, in response to determining the completion status of the combination of the preset first business task and preset first conversation task and a difference between a moment to complete the preset first business task and a moment to complete the preset first conversation task is less than a second threshold value, configured to obtain a user data update volume corresponding to a first task group according to a mapping relationship between a task group and the user data update volume, and to update the user data corresponding to the first user according to the user data update volume corresponding to the first task group such that the security of updating the user data is improved, wherein the first task group comprises the first business task and the first conversation task.

16. The system according to claim 15, wherein the task server further comprises:
a business task unit configured to, before the flow obtaining unit obtains the business flow data and the conversation flow data of the first user, send descriptive information of the first business task group to a client terminal used by the first user, and record a mapping relationship between the first user and the first task group.

17. The system according to claim 16, wherein for determining whether the first user has completed the preset first conversation task according to the obtained conversation flow data, the task-completion determining unit is configured to:
determine a number n of second users who have had a conversation with the first user according to the obtained conversation flow data, wherein the number n is a positive integer;
determine the first user has not completed the preset first conversation task when any one second user from the number n of the second users does not belong to a same user group of the first user; and
determine the first user has completed the preset first conversation task, when at least one second user from the number n of the second users belongs to the same user group of the first user and when the first user is determined to have a conversation with the at least one second user for a time length longer than a first threshold value.

18. The system according to claim 17, wherein the flow obtaining unit is configured to:
obtain the business flow data and the conversation flow data of the first user, when triggered by a preset event or instructed by a user control instruction.

* * * * *